US010105876B2

United States Patent
Lind et al.

(10) Patent No.: US 10,105,876 B2
(45) Date of Patent: Oct. 23, 2018

(54) APPARATUS FOR GENERATING AND DISPENSING A POWDERED RELEASE AGENT

(71) Applicant: U T-Battelle, LLC, Oak Ridge, TN (US)

(72) Inventors: Randall F. Lind, Loudon, TN (US); Brian K Post, Knoxville, TN (US); Phillip C. Chesser, Knoxville, TN (US); Andrew P. Reis, Knoxville, TN (US); Alex C. Roschli, Kingston, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 323 days.

(21) Appl. No.: 14/960,647

(22) Filed: Dec. 7, 2015

(65) Prior Publication Data

US 2017/0157805 A1    Jun. 8, 2017

(51) Int. Cl.
| | |
|---|---|
| *B29C 37/00* | (2006.01) |
| *B33Y 30/00* | (2015.01) |
| *B33Y 40/00* | (2015.01) |
| *B29C 64/40* | (2017.01) |
| *B29C 64/205* | (2017.01) |

(52) U.S. Cl.
CPC .......... *B29C 37/0071* (2013.01); *B33Y 30/00* (2014.12); *B33Y 40/00* (2014.12); *B29C 64/205* (2017.08); *B29C 64/40* (2017.08)

(58) Field of Classification Search
CPC .......................... B29C 37/0071; B29C 64/205
See application file for complete search history.

(56) References Cited

U.S. PATENT DOCUMENTS

| | | | | |
|---|---|---|---|---|
| 5,207,371 | A * | 5/1993 | Prinz ...................... | B22F 3/008 164/46 |
| 5,364,037 | A | 11/1994 | Bigelow | |
| 5,503,785 | A * | 4/1996 | Crump .................. | B33Y 10/00 264/308 |
| 6,378,794 | B1 | 4/2002 | Wu | |
| 7,261,542 | B2 * | 8/2007 | Hickerson ............. | B33Y 10/00 264/308 |
| 9,029,058 | B2 * | 5/2015 | Martin ................... | G03G 5/071 430/109.3 |
| 2001/0030383 | A1 * | 10/2001 | Swanson ................ | B29C 41/36 264/308 |
| 2003/0004600 | A1 * | 1/2003 | Priedeman, Jr. ...... | B29C 41/003 700/119 |

(Continued)

*Primary Examiner* — Edmund H Lee
*Assistant Examiner* — Nicholas R Krasnow
(74) *Attorney, Agent, or Firm* — Colin L. Cini (57) ABSTRACT

An apparatus 20 and a method 100 for generating and dispensing a powdered 60 release agent during an additive manufacturing build is disclosed. A solid body 28 of release agent material is ground insitu by a grinder 50 and dispensed on a surface of the part 72 to prevent adhesion of an adjacent layer of a base material 70. With the addition of the powdered 60 release agent, a support structure 76 is easily separated from the base material 70 when the part 72 is complete, saving time and preventing the part 72 from sustaining unintentional damage. Since no powdered 60 release agent is actually loaded or stored in the apparatus 20, the potential for spillage, waste, inconsistent dispensing, inadvertent dispensing, and clumping due to humidity is eliminated.

11 Claims, 8 Drawing Sheets

(56) References Cited

U.S. PATENT DOCUMENTS

2003/0178750 A1\* 9/2003 Kulkarni ................ B33Y 10/00
  264/401
2018/0036801 A1\* 2/2018 Ishihara ................ B22F 3/1055

\* cited by examiner

APPARATUS FOR GENERATING AND DISPENSING A POWDERED RELEASE AGENT

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

CROSS-REFERENCE TO RELATED APPLICATIONS

None.

THE NAMES OF THE PARTIES TO A JOINT RESEARCH AGREEMENT

None.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

None.

STATEMENT REGARDING PRIOR DISCLOSURES BY THE INVENTOR OR A JOINT INVENTOR

None.

BACKGROUND OF THE INVENTION

1. Field of the Invention

The present disclosure relates to additive manufacturing and more specifically to machines and methods for generating and dispensing a powdered release agent material between layers of a part as it is being built. The powdered release agent significantly improves the process of separating supports from a part after it is built.

2. Description of the Related Art

Additive manufacturing is a process used to efficiently manufacture three-dimensional parts layer-by-layer. Unlike subtractive technologies that require additional time and energy to remove excess material from oversized raw stock, additive manufacturing deposits material only where it is needed, making very efficient use of time, energy and raw materials. Additive manufacturing may be accomplished using polymers, alloys, resins or other materials that transition from a liquid or powder to a solid.

The Manufacturing Demonstration Facility (MDF) at Oak Ridge National Laboratory (ORNL) pioneered the Big Area Additive Manufacturing (BAAM) technology, which is based on extruding thermoplastic pellets through a screw extruder in very large-scale. In order to construct features such as cantilevered beams, overhangs, and arches, sacrificial supports must be built to counteract gravity. Once the part is complete, the sacrificial supports are removed using various mechanical and/or chemical means. The removal of support structures is time-consuming and the part can be unintentionally damaged. The removal of supports becomes increasingly more difficult when large-scale parts are built due to the size and weight of the parts and the support structure.

Improvements are needed to advance additive manufacturing beyond the current state of the art.

BRIEF SUMMARY OF THE INVENTION

Disclosed are several examples of additive manufacturing machines and methods for generating and dispensing a powdered release agent material between layers of a part made using additive manufacturing.

The following summary is provided to facilitate an understanding of some of the innovative features unique to the embodiments and is not intended to be a full description. A full appreciation of the various aspects of the embodiments disclosed can be gained by taking the entire specification, drawings, claims and abstract as a whole.

Provided is an apparatus for generating and dispensing a powdered release agent material on a surface of a part that is being built with an additive manufacturing machine. A housing includes an attachment for fastening the apparatus to the additive manufacturing machine. A magazine affixed to the housing feeds a solid body of release agent material into a grinding chamber defined by the housing. A grinder disposed inside of the grinding chamber powderizes the release agent material. Finally, a nozzle dispenses the powdered release agent material on a surface of the part.

Provided is a method for generating and dispensing a powdered release agent material on a surface of a part that is being built with an additive manufacturing machine. First, an apparatus as described above is provided. Second, at least one solid body of release agent material is loaded into the magazine. Third, a solid body of release agent material is fed from the magazine into the grinding chamber. Fourth, the apparatus is positioned with the additive manufacturing machine so that the nozzle is adjacent to the surface to receive powdered release agent. Fifth, the grinder is rotated to generate a powdered release agent. Sixth, the powder is dispensed from the nozzle onto the surface of the part.

BRIEF DESCRIPTION OF THE SEVERAL VIEWS OF THE DRAWING(S)

The apparatuses, methods and articles may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION OF THE INVENTION

Figure 1:
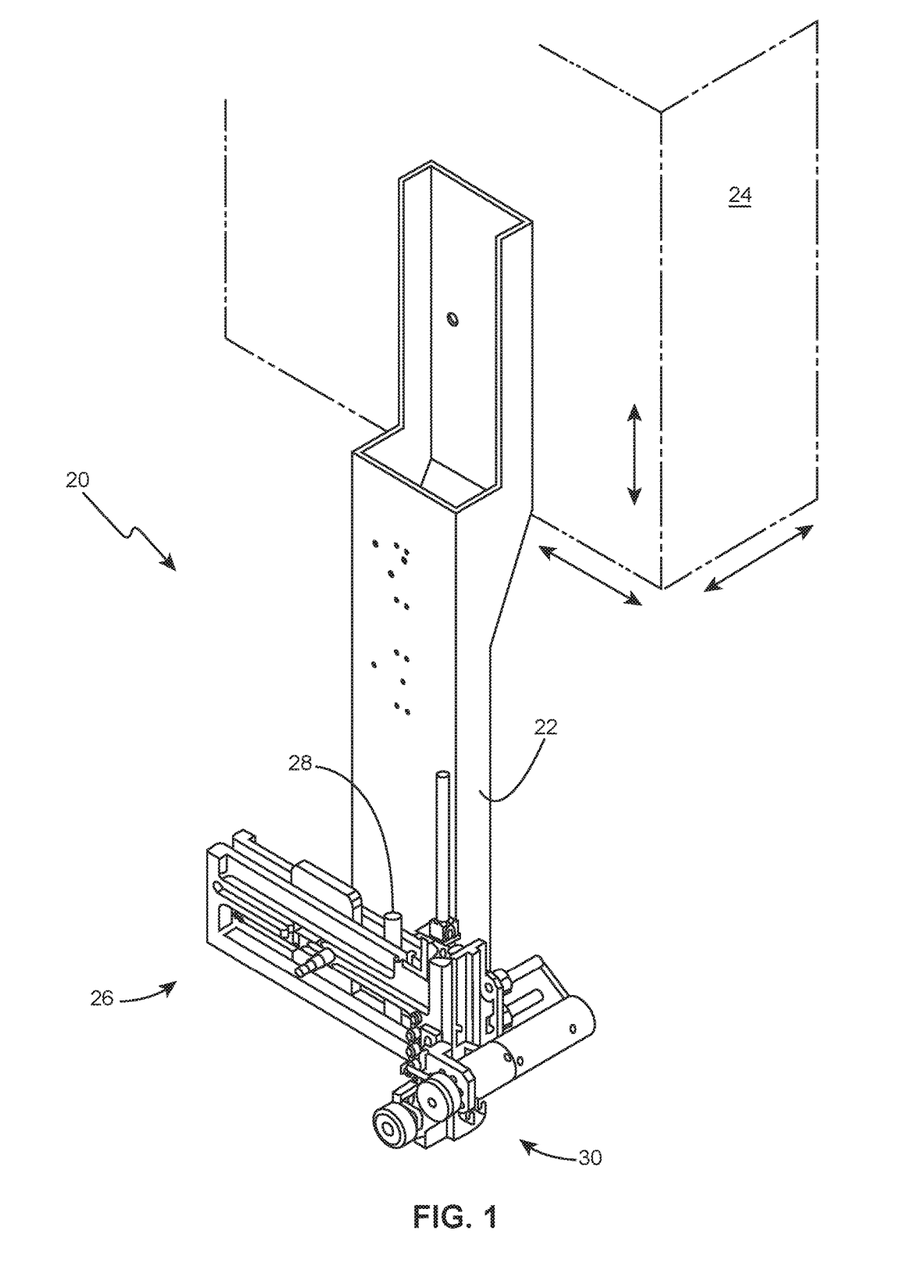
FIG. 1 is an isometric view of an exemplary apparatus with portions of an additive manufacturing machine illustrated with phantom lines.
Figure 2:
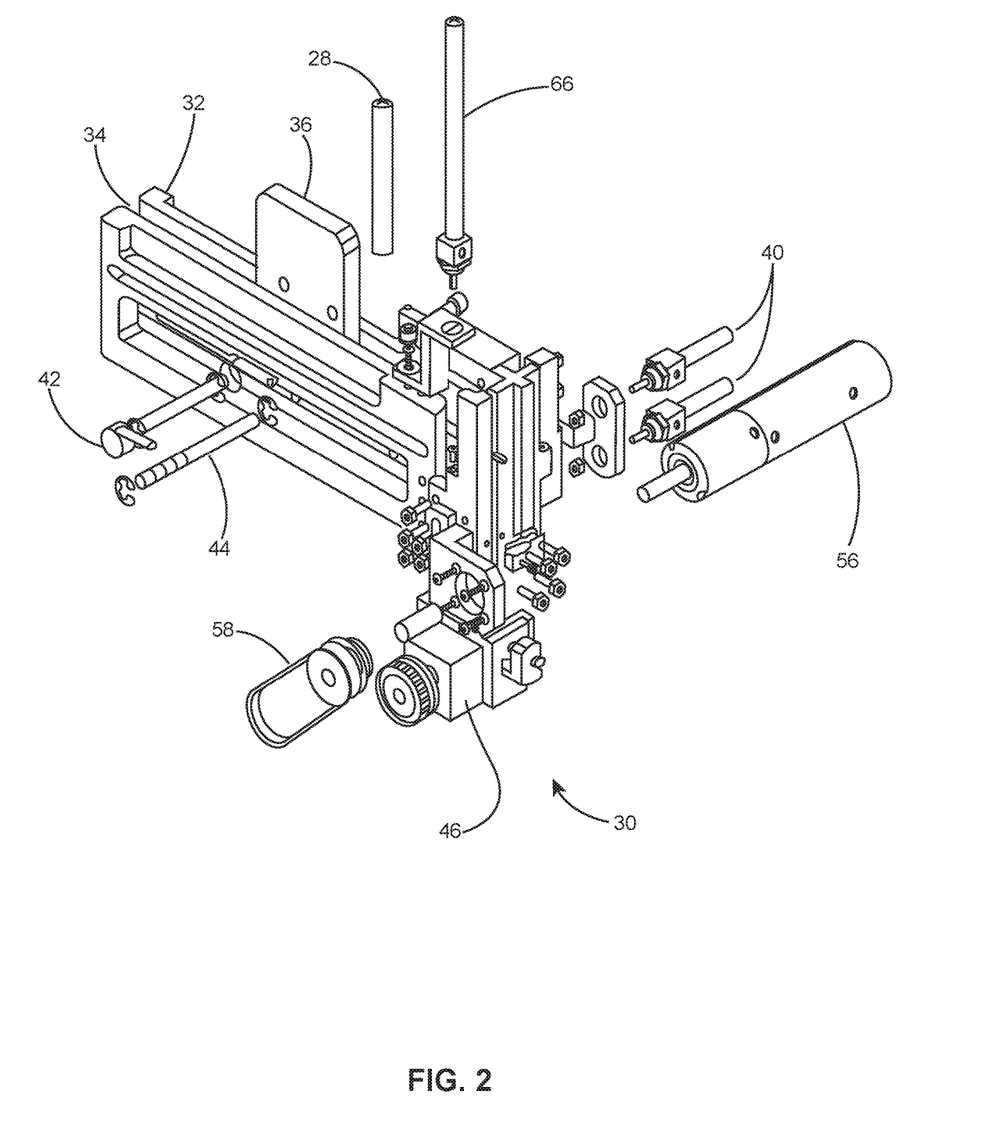
FIG. 2 is an exploded view of the exemplary apparatus of FIG. 1 with the attachment removed for clarity.

With reference first to FIGS. 1-2, the major assemblies of an apparatus 20 for generating and dispensing a powdered release agent will now be described. An attachment 22 mounts the apparatus 20 to a component of the additive manufacturing machine 24 that provides up to six axes of controlled movements. For example, the apparatus 20 may be mounted to a nozzle assembly of the additive manufacturing machine 24 and its functions managed by a common controller. In another example, the apparatus 20 is mounted to a dedicated arm of the additive manufacturing machine 24 that is managed by a common controller. In other examples, the apparatus 20 is separately managed by a dedicated controller. A magazine 26 stores one or more solid bodies 28 of release agent material which, in turn, are powderized insitu in a grinder assembly 30. Other features of the major assemblies will now be described in greater detail.

Figure 3:
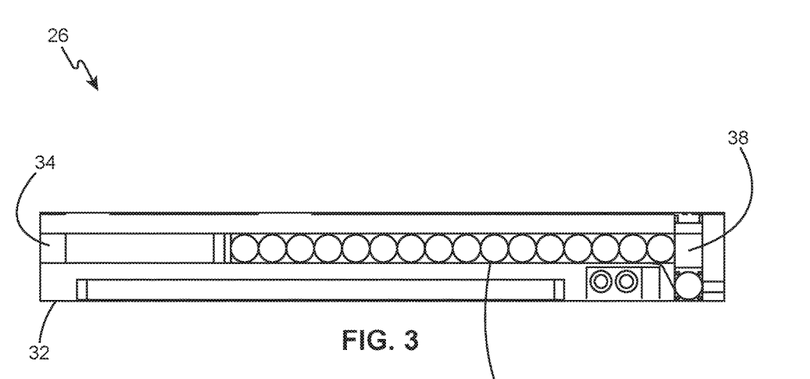
FIG. 3 is a top view of an exemplary magazine.
Figure 4:
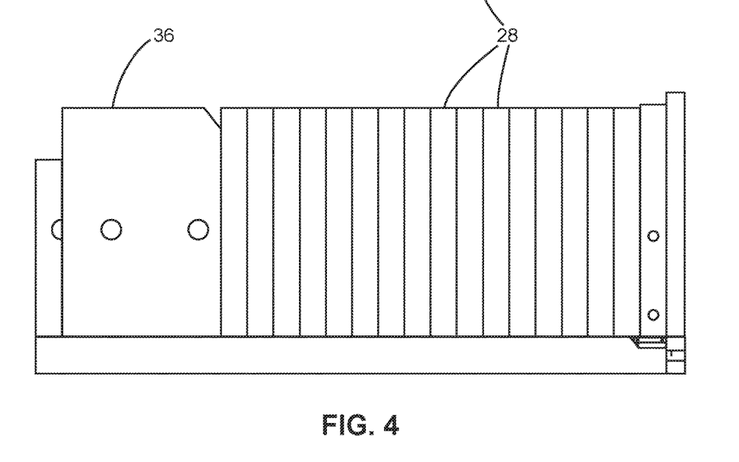
FIG. 4 is a front view of the exemplary magazine of FIG. 3.

With reference now to FIGS. 3-4, an exemplary magazine 26 with horizontal stacking will now be described. A frame 32 defines a track 34 for accepting a slider 36 and one or more solid bodies 28 of release agent material. In this example, the solid bodies 28 are cylindrical shaped, but other shapes, such as square or hexagonal, for example, may be used. The slider 36 contacts the last solid body 28 and loads the first solid body 28 against an escapement plunger 38. When a solid body 28 is requested by the controller, the escapement plunger 38 retracts via one or more pneumatic cylinders 40 (FIG. 2) and constant force springs 42 pull the slider 36 forward, loading the next available solid body 28 in front of the retracted escapement plunger 38. The escapement plunger 38 then extends into the track 34 via the one or more cylinders 40, feeding the loaded solid body 28 and blocking the remaining solid bodies 28. Miniature pneumatic cylinders PN sdr-05-12 from Clippard Instrument Laboratory, Inc., were used for the cylinders 40 for example. A handle 44 affixed to the slider 36 allows it to be manually retracted for loading additional solid bodies 28 into the track 34. The escapement plunger 38 function is managed by the controller, automatically with a switch or manually with a switch.

Figure 5:
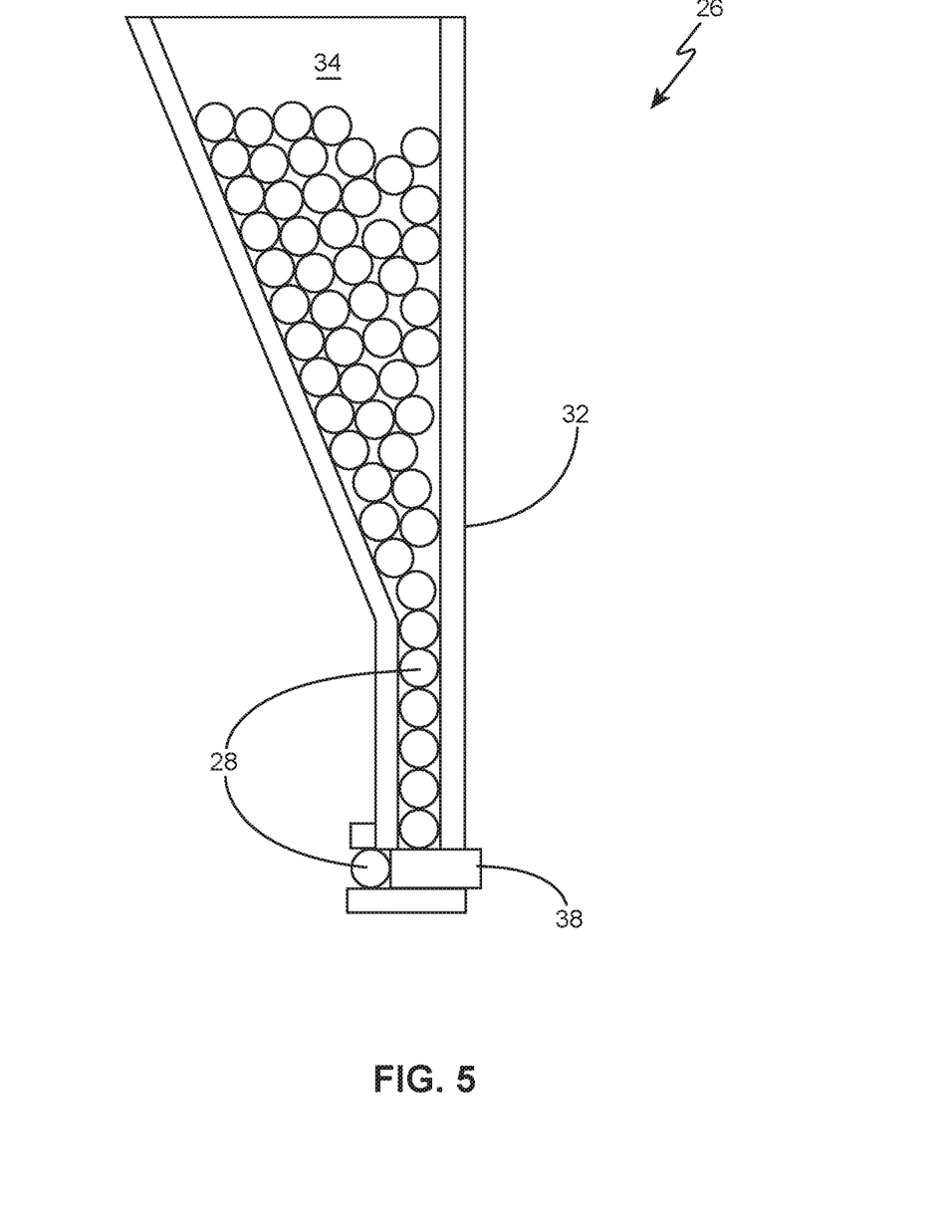
FIG. 5 is a side view of another exemplary magazine.
Figure 6:
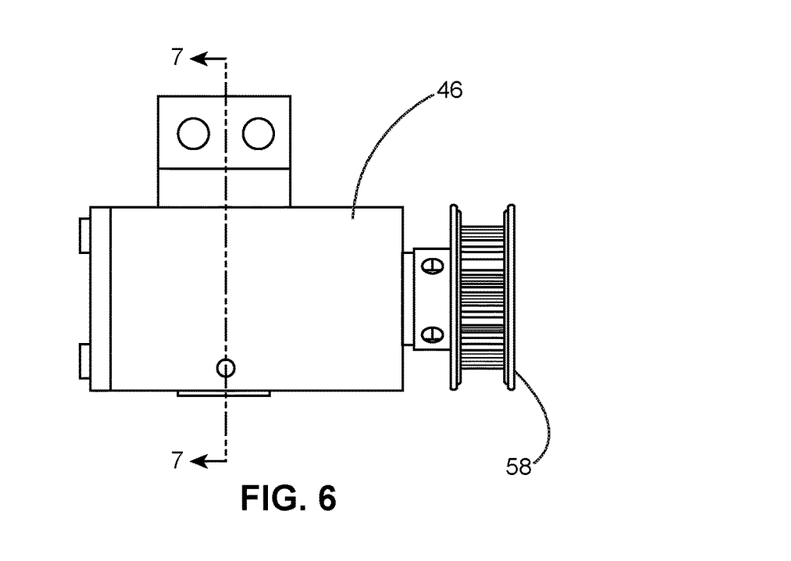
FIG. 6 is a side view of an exemplary grinder assembly.

With reference now to FIG. 5, an exemplary magazine 26 with vertical stacking will be described. In this embodiment, the slider 36, constant force springs 42 and handle 44 are not necessary. A frame 32 defining a converging track 34 allows the solid bodies 28 to be automatically fed by gravity against the escapement plunger 38. Upon command, the escapement plunger 38 retracts to load the next available solid body 28 and then extends into the track 34 to feed the loaded solid body 28 from the magazine 26. A transparent frame 32 or windows in the frame 32 allow the inventory of solid bodies 28 to be visually monitored.

Figure 7:
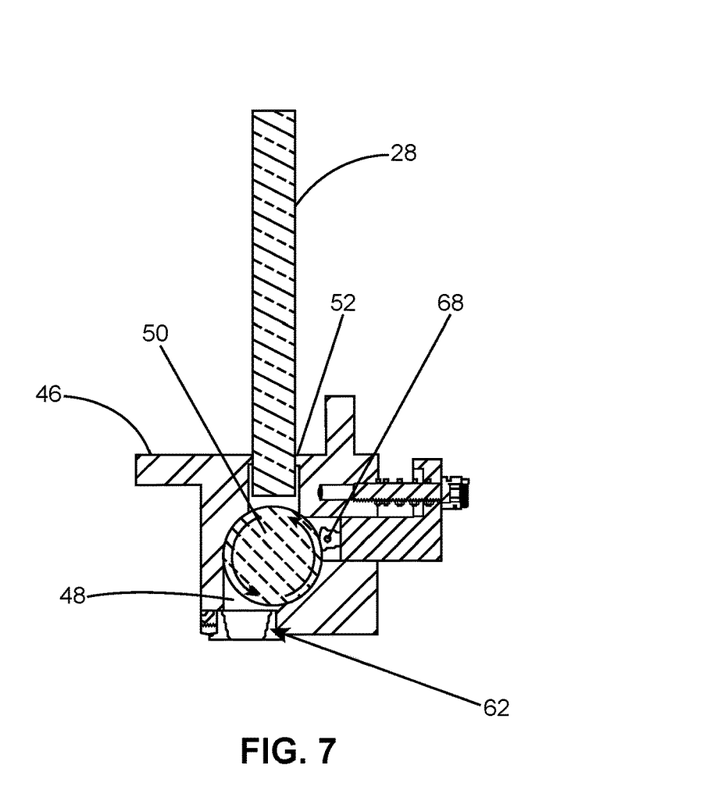
FIG. 7 is a sectional view of the exemplary grinder assembly of FIG. 6 taken along line 7-7.
Figure 8:
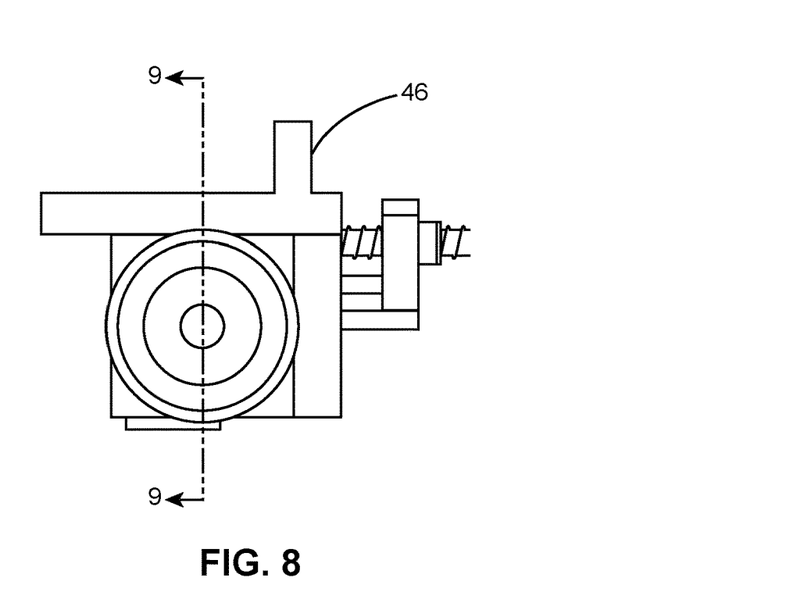
FIG. 8 is a side view of the exemplary grinder assembly of FIG. 6.
Figure 9:
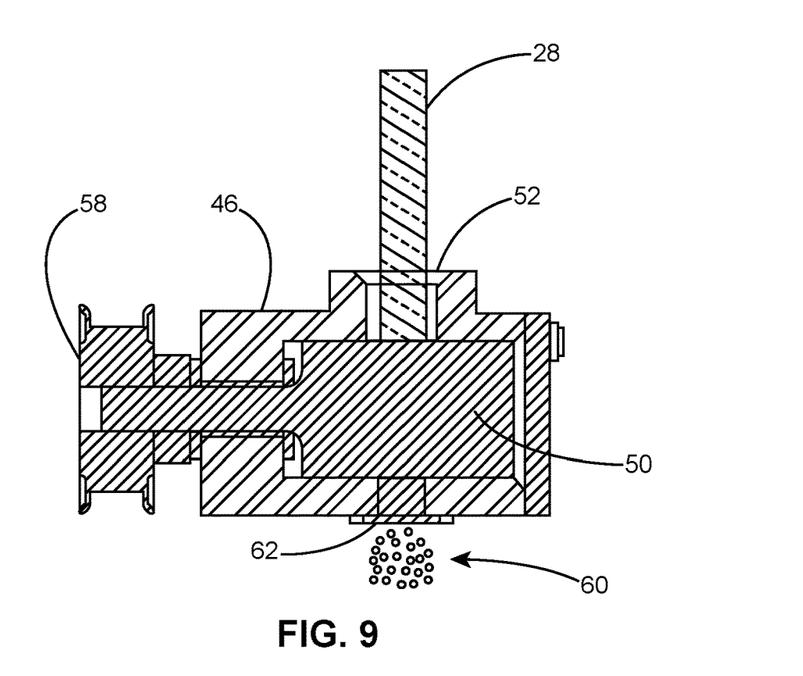
FIG. 9 is a sectional view of the exemplary grinder assembly of FIG. 8 taken along line 9-9.

Referring now to FIGS. 6-9 further details of an exemplary grinder assembly 30 will be described. A housing 46 defines a grinding chamber 48, which accepts a rotatable grinder 50. A tight tolerance between the housing 46 and the grinder 50 must be maintained to prevent small pieces of release agent material from becoming wedged between the housing 46 and the grinder 50. An inlet 52 receives a solid body 28 of release material fed from the magazine 26 and positions it at the center and perpendicular to the grinder 50. The inlet 52 may be open to the top or a side of the housing 46, depending on the positioning of the magazine 26. The grinder 50 includes an abrasive surface 54, having protruding teeth, knife edges, burrs and the like. A sharp-tooth grinding bit or wheel, PN 4257A831 from McMaster Carr Supply company, was used for the grinder 50 for example. A variable speed electric motor 56 (FIGS. 1-2) turns the grinder 50 directly or through a drive 58 such as a toothed belt and pulleys as shown. Please note that the direction of the grinder 50 is counter clockwise as shown in FIG. 7 to effectively direct the powdered 60 release agent to an outlet nozzle 62. The outlet nozzle 62 may be straight or curved and includes an orifice 64 that may be sized and shaped to control the pattern of powdered 60 release agent dispensed. The volume of powdered 60 release agent is controlled by the speed of the motor 56 with a greater volume of powder released at the rotational speed increases. A device 66 for applying a load, such as a pneumatic cylinder (FIGS. 1-2), drives the solid body 28 into the grinder 50. A miniature pneumatic cylinder, PN sdr-05-4 from Clippard Instrument Laboratory, Inc. was used as the loading device 66 for example. An adjustable brush 68 contacts the abrasive surface 54 and dislodges any accumulated powdered 60 release agent as the grinder 50 turns.

The powdered 60 release agent impedes adhesion and cross linking between adjacent layers of a base material 70 of an article 72 made by additive manufacturing. By generating the powdered 60 release agent from a solid body 28, insitu, the powder 60 can be dispensed in the exact location, in the exact amount and at the exact time needed. Since no powder 60 is actually loaded or stored in the apparatus 20, the potential for spillage, waste, inconsistent dispensing, inadvertent dispensing, and clumping due to humidity is eliminated. The powder 60 grain size is consistent and depends on the grinder 50 chosen. The preferred release agent material is Chalk, which is a form of Calcium Carbonate ($CaCO_3$), although Talc, Limestone, Cornstarch, Corn meal, Graphite, Gypsum, or other solid release agents may be used. The preferred size of the solid bodies 28 is approximately 0.35 of an inch (9 millimeters) in diameter and 3.15 inches (80 millimeters) long.

Figure 10:
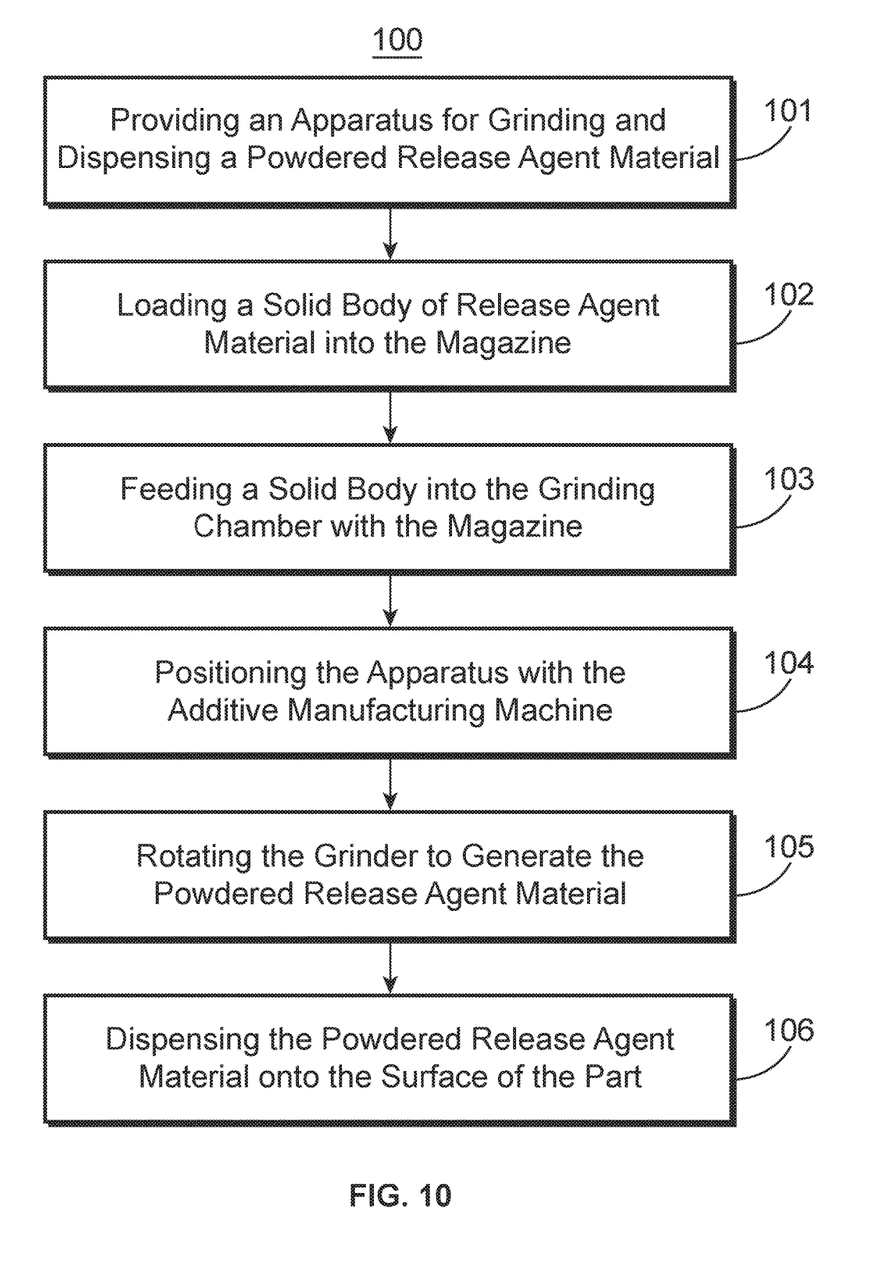
FIG. 10 is a flow chart illustrating exemplary method steps for generating and dispensing a powdered release agent material.

A method 100 for dispensing a powdered release agent is schematically shown in FIG. 10. In step 101, an apparatus as described above is provided. In step 102, a solid body 28 is loaded into a magazine 26. In step 103, the solid body 28 is fed into a grinding chamber 48. In step 104, the apparatus 20 is positioned over the surface of the part. In step 105, the grinder 50 is rotated. In step 106, the powdered 60 release agent is dispensed from the outlet nozzle 62. In some examples, steps 104-106 are performed simultaneously.

Figure 11:
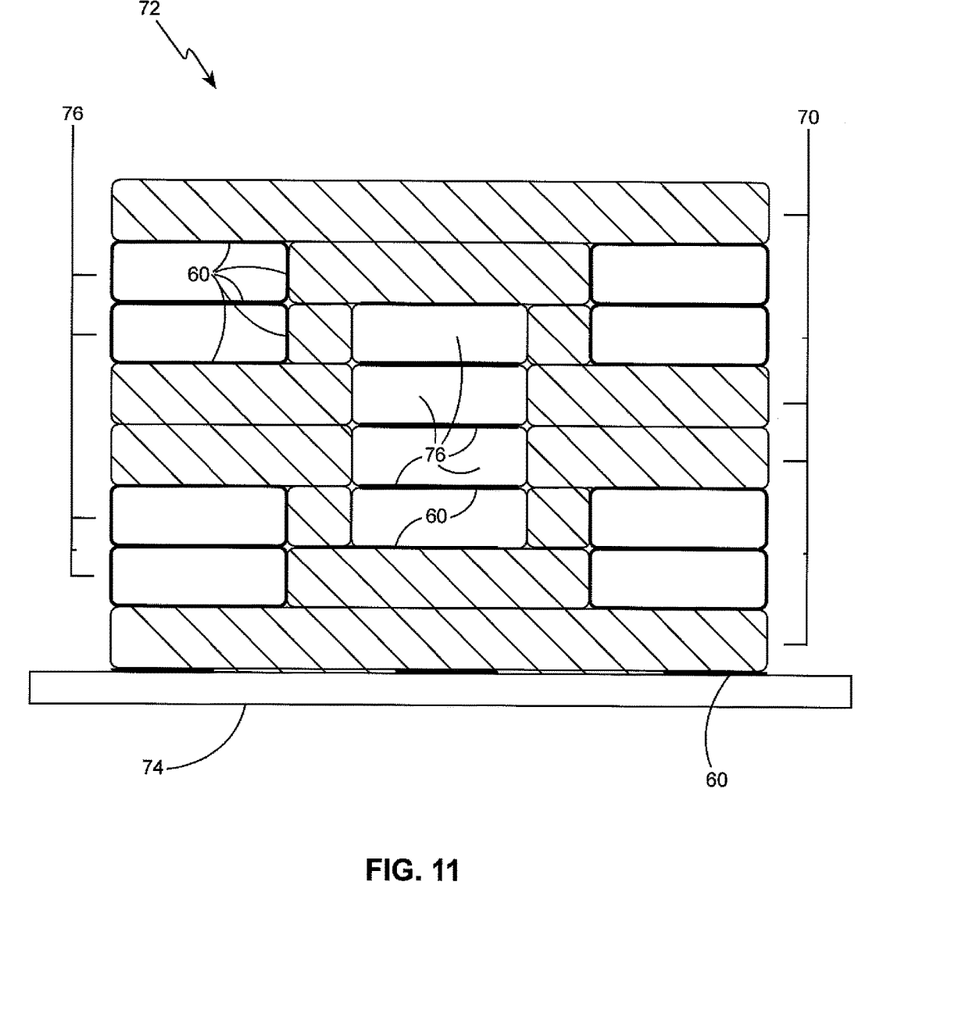
FIG. 11 is a sectional schematic representation of a 3D article of manufacture.

FIG. 11 illustrates an exemplary part, build or article of manufacture 72 that is manufactured by additive manufacturing while using the disclosed apparatus 20 and method 100. A base material 70, such as polymer plastic for example, is deposited by a nozzle in layers on a build platform 74. Features such as cantilevered beams, arches, holes and the like require a support structure 76 to counteract the effect of gravity. The support structure 76 may be made of the base material 70 or another material. After the support structure 76 is complete and before a subsequent and/or an adjacent layer of base material 70 is deposited by the nozzle, the powdered 60 release agent material is dispensed by the apparatus 20. With the addition of the powdered 60 release agent, the support structure 76 is easily separated from the base material 70 when the part is complete, saving time and preventing the part 72 from sustaining unintentional damage. Note that the powdered 60 release agent material may also be dispensed on portions of the platform 74 to simplify the removal of the part 72.

While this disclosure describes and enables several examples of apparatuses and methods for generating and dispensing a powdered release agent, other examples and applications are also contemplated. Accordingly, the invention is intended to embrace those alternatives, modifications, equivalents, and variations as fall within the broad scope of the appended claims. The technology disclosed and claimed herein may be available for licensing in specific fields of use by the assignee of record.

What is claimed is:

1. An apparatus for generating and dispensing a powdered release agent material on a surface of a part that is being built with an additive manufacturing machine, the apparatus comprising:
    a housing having an attachment for fastening the apparatus to the additive manufacturing machine;
    a magazine affixed to said housing for feeding a solid body of release agent material into a grinding chamber defined by said housing wherein said magazine includes an escapement to ensure that exactly one solid body of release agent material at a time is fed from a plurality of solid bodies of release agent material that are stacked in said magazine;
    a grinder disposed inside of the grinding chamber for powderizing the release agent material; and
    a nozzle for dispensing the powdered release agent material on the surface of the part.

2. The apparatus of claim 1 wherein said grinder comprises an abrasive wheel that is rotated by a motor.

3. The apparatus of claim 2 wherein the rotational speed of the motor is variable.

4. The apparatus of claim 1 wherein the plurality of solid bodies are stacked together horizontally in said magazine.

5. The apparatus of claim 1 wherein the plurality of solid bodies are stacked together vertically in said magazine.

6. The apparatus of claim 1 wherein the escapement is driven by a pneumatic cylinder.

7. The apparatus of claim 1 and further comprising a device for applying a load to the solid body of release agent material to drive it against the grinder.

8. The apparatus of claim 1 and further comprising a brush that contacts the grinder to release accumulated powdered release agent material from the grinder as it turns.

9. The apparatus of claim 1 and further comprising one or more solid bodies of release agent material stacked in said magazine.

10. The apparatus of claim 9 wherein the solid bodies of release agent material are cylindrical shaped.

11. An additive manufacturing machine comprising:
    a first nozzle for depositing a base material;
    a housing having an attachment for fastening the apparatus to the additive manufacturing machine;
    a magazine affixed to said housing for feeding a solid body of release agent material into a grinding chamber defined by said housing wherein said magazine includes an escapement to ensure that exactly one solid body of release agent material at a time is fed from a plurality of solid bodies of release agent material that are stacked in said magazine;
    a grinder disposed inside of the grinding chamber for powderizing the release agent material; and
    a second nozzle for dispensing the powdered release agent material onto the base material.

* * * * *